United States Patent
Ohnishi et al.

(10) Patent No.: US 8,085,343 B2
(45) Date of Patent: Dec. 27, 2011

(54) IMAGE CAPTURE APPARATUS

(75) Inventors: Yusuke Ohnishi, Kanagawa (JP);
Tomoyuki Kubotera, Tokyo (JP); Ryo Kotake, Kanagawa (JP); Hisaoki Oba, Tokyo (JP); Noriaki Takagi, Tokyo (JP)

(73) Assignee: Sony Corporation (JP)

( * ) Notice: Subject to any disclaimer, the term of this patent is extended or adjusted under 35 U.S.C. 154(b) by 396 days.

(21) Appl. No.: 12/011,657

(22) Filed: Jan. 29, 2008

(65) Prior Publication Data

US 2008/0180568 A1    Jul. 31, 2008

(30) Foreign Application Priority Data

Jan. 31, 2007  (JP) ................ P2007-022297

(51) Int. Cl.
*H04N 5/225* (2006.01)
(52) U.S. Cl. ............... 348/373; 348/375; 348/376
(58) Field of Classification Search .......... 348/373, 348/375, 376
See application file for complete search history.

(56) References Cited

U.S. PATENT DOCUMENTS

| 4,736,219 A | * | 4/1988 | Yamanaka et al. | 396/540 |
| 5,970,265 A | * | 10/1999 | Schelling | 396/348 |
| 6,796,727 B2 | * | 9/2004 | Tanabe | 396/448 |
| 2006/0163095 A1 | * | 7/2006 | Yanagisawa et al. | 206/316.2 |
| 2006/0187316 A1 | * | 8/2006 | Teramoto et al. | 348/231.3 |

FOREIGN PATENT DOCUMENTS

| JP | 11-002855 A | 1/1999 |
| JP | 2005-115109 A | 4/2005 |

* cited by examiner

*Primary Examiner* — Anthony J Daniels
(74) *Attorney, Agent, or Firm* — Lerner, David, Littenberg, Krumholz & Mentlik, LLP

(57) ABSTRACT

An image capture apparatus includes an outer housing, a capturing lens, a slide cover, and a grip projection portion. The capturing lens is disposed on a front face of the outer housing. The slide cover is slidable relative to the outer housing between a closed position covering the capturing lens and an open position uncovering the capturing lens. The grip projection portion projects from the outer housing and includes a finger placing portion that allows a user to place fingers of a user. The finger placing portion is positioned frontwardly of the slide cover.

5 Claims, 16 Drawing Sheets

IMAGE CAPTURE APPARATUS

CROSS REFERENCES CROSS-REFERENCE TO RELATED APPLICATIONS

The present application claims priority from Japanese Patent Application No. JP 2007-022297 filed in the Japanese Patent Office on Jan. 31, 2007, the entire content of which is incorporated herein by reference.

BACKGROUND OF THE INVENTION

1. Field of the Invention

The present invention relates to the technical field of image capture apparatuses.

2. Description of the Related Art

Existing image capture apparatuses include those of the type having a slide cover provided on a front face of an outer housing face of the apparatus, in which the slide opens or closes to cover or uncover a capturing lens. With the slide cover provided, the capturing lens can be protected in the non-capture event. For example, in Japanese Unexamined Patent Application Publication No. 2005-115109 and corresponding to U.S. Patent Application No. 2006-0163095A (Ser. No. 537721), there is disclosed an image capture apparatus including a slidable slide cover for covering or uncovering a capturing lens.

Further, there are image capture apparatuses of the type that includes a grip projection portion that allows a user to hold the apparatus with fingers of the user in the capture event. The provision of the grip projection portion enables securing high holdability of the apparatus, thereby to enable preventing motion blurring caused by a camera shake or the like.

Existing image capture apparatuses including such a slide cover and a grip projection portion as described above include those of two types. In one type, the slide cover and grip projection portion are provided spaced apart from one another along the right-left direction on, the front face of the outer housing. In the other type, the grip projection portion is provided to the slide cover on the front face of the outer housing. As an example, a digital still camera DSC-T30 (Trademark of Sony Corporation) is the type in which the slide cover and grip projection portion are provided spaced apart from one another along the right-left direction on the front face of the outer housing.

However, in an image capture apparatus of the other type in which the grip projection portion is provided to the slide cover, the grip projection portion is provided to the slide cover, which is a movable member. In this case, there can occur a case in which the state in which the image capture apparatus is held with fingers placed on the grip projection portion is unstable, such that the apparatus is poor in ease of use or usability.

SUMMARY OF THE INVENTION

Under the circumstances described above, it would be desirable to provide an image capture apparatus improved in ease of use or usability.

According to an embodiment of the present invention, an image capture apparatus includes an outer housing; a capturing lens disposed on a front face of the outer housing; a slide cover slidable relative to the outer housing between a closed position covering the capturing lens and an open position uncovering the capturing lens; and a grip projection portion projecting from the outer housing and including a finger placing portion allowing a user to place fingers of a user. The finger placing portion is positioned frontwardly of the slide cover.

The embodiment may be such that the slide cover is slidable along an upward-downward direction of the outer housing; an upper end of a slide stroke in the upward-downward direction corresponds to the closed position, and a lower end of the slide stroke corresponds to the open position; and in the open position, a top face of the slide cover and a top face of the grip projection portion match with one another.

Further, the embodiment may be such that the outer housing, the slide cover, and the finger placing portion respectively may include portions overlapping with one another.

Further, the embodiment may be such that the grip projection portion may include a continually formed portion projecting from a sidewall of the outer housing; and the finger placing portion projecting from a front end side of the continually formed portion and positioned forwardly of the slide cover and on a front face of the slide cover.

Further, the embodiment may be such that a width of the front face of the outer housing in a direction perpendicular to a slide direction of the slide cover may be substantially the same as a width of the slide cover in the direction perpendicular to the slide direction.

Thus, according to the embodiment, the image capture apparatus is improved in ease of use or usability.

BRIEF DESCRIPTION OF THE DRAWINGS

In the accompanying drawings:

FIG. 1 to 16 respectively show a preferred embodiment of the present invention, in which FIG. 1 is a perspective view of an image capture apparatus of the embodiment in which a slide cover is in a closed position;

FIG. 2 is a perspective view of the image capture apparatus in which the slide cover is in an open position;

FIG. 3 is a perspective view of a rear face side of the image capture apparatus;

FIG. 4 is an exploded perspective view showing a monitor block and members for holding the monitor block in the embodiment;

FIG. 5 is an enlarged plan view of the image capture apparatus;

FIG. 6 is a perspective view showing a state in which the image capture apparatus is held in a capture event;

FIG. 7 is a schematic cross sectional view showing a state in which a grip projection portion is provided to project from a front face of a grip projection portion;

FIG. 8 is an exploded perspective view showing a front panel, a coupling plate, and a slide cover;

FIG. 9 is an exploded perspective view showing a slide mechanism and components related to the slide mechanism;

FIG. 10 is a perspective view showing the slide mechanism and the components related to the slide mechanism;

FIGS. 11 and 12, respectively, are views showing operation of the slide mechanism in opening and closing events, in which FIG. 11 is an enlarged schematic front view of a state in which the slide cover is in an open position;

FIG. 12 is an enlarged schematic front view of a state in which the slide cover is in a closed position;

FIG. 13 is an enlarged cross sectional view showing the positional relationship between a zoom key and a recess portion;

FIG. 14 is an enlarged front view of an operation key;

FIG. 15 is a flow diagram showing a process in the event that operation has been performed with the operation key;

FIG. 16 is an enlarged cross sectional view showing a state in which the monitor block is mounted;

DETAILED DESCRIPTION OF THE PREFERRED EMBODIMENT

Figure 1:
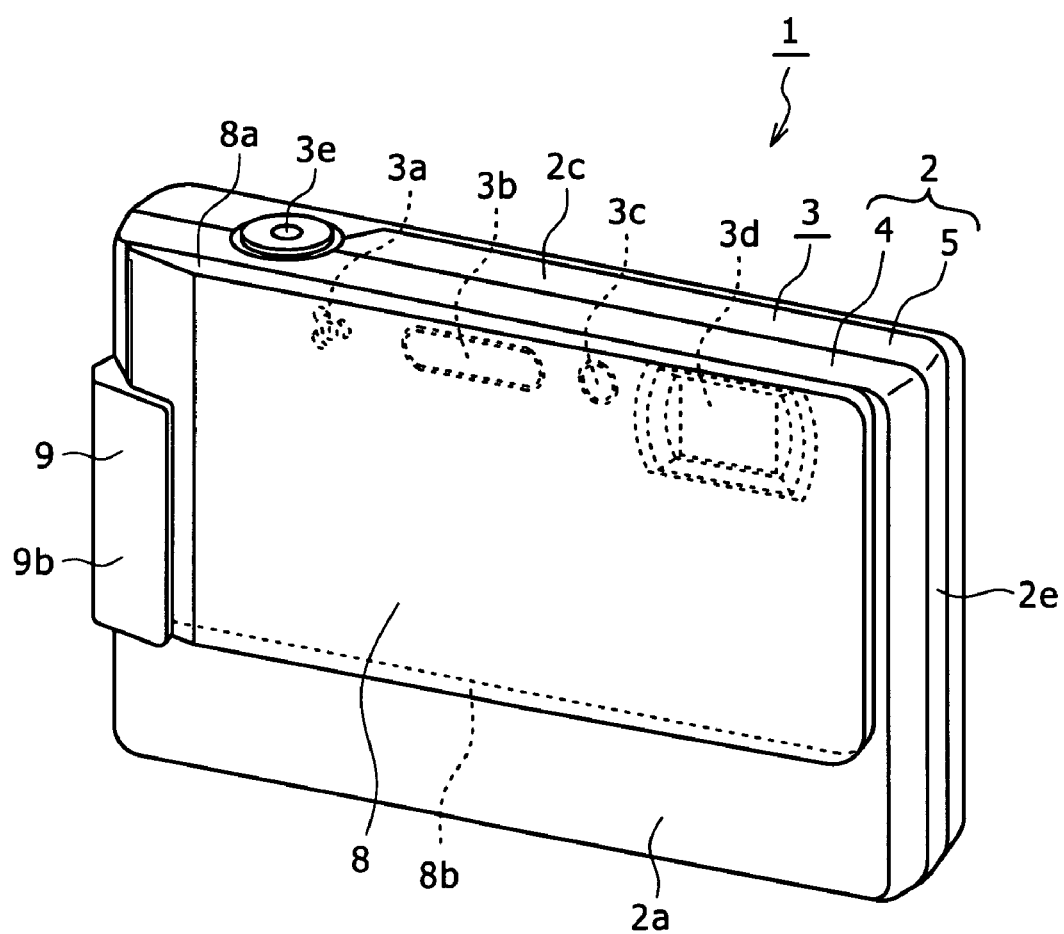

A preferred embodiment of the present invention will be described with reference to the accompanying drawings.

The preferred embodiment refers to a still camera, such as a digital still camera or film camera, to which the present invention is adapted. However, adaptations of the present invention are not limited to such still cameras, and the present invention may be widely adapted to a large variety of image capture apparatuses built in, for example, video cameras for capturing motion images and other devices.

In description herebelow, the backward, forward, upward, downward, leftward, and rightward directions correspond to directions as viewed from a camera operator (user) in the capture event (the upward-downward direction and the leftward-rightward direction herebelow will alternatively referred to as "vertical direction" and "horizontal (or lateral) direction," respectively). As such, the subject side corresponds to the forward direction, and the camera operator side corresponds to the rearward direction.

However, the backward, forward, upward, downward, leftward, and rightward directions in description herebelow are for the convenience of direction, and the directions in practically carrying out the present invention are not limited thereto.

An image capture apparatus 1 (digital still camera) includes a main body 3 including necessary functional portions and components disposed in an outer housing 2. The outer housing 2 is substantially a flat, rectangular parallelepiped with having horizontal sides longer than vertical sides (see FIGS. 1 to 3). More specifically, an outer wall of the outer housing 2 has a front wall 2a, a rear wall 2b, a top wall 2c, a bottom wall 2d, a left sidewall 2e, and a right sidewall 2f.

The outer housing 2 is formed from a front panel 4 and rear panel 5 coupled to face one another along the frontward-rearward direction. The front panel 4 is like a thin box rearwardly opened, and the rear panel 5 is like a thin box frontwardly opened. A large rectangular monitor disposition opening 6 is formed in a portion excluding a right edge portion of the rear panel 5 (see FIG. 4). In addition, button/key disposition openings 7 (7 and 7) are formed vertically apart from one another in a right edge portion of the rear panel 5 (see FIG. 4).

Figure 2:
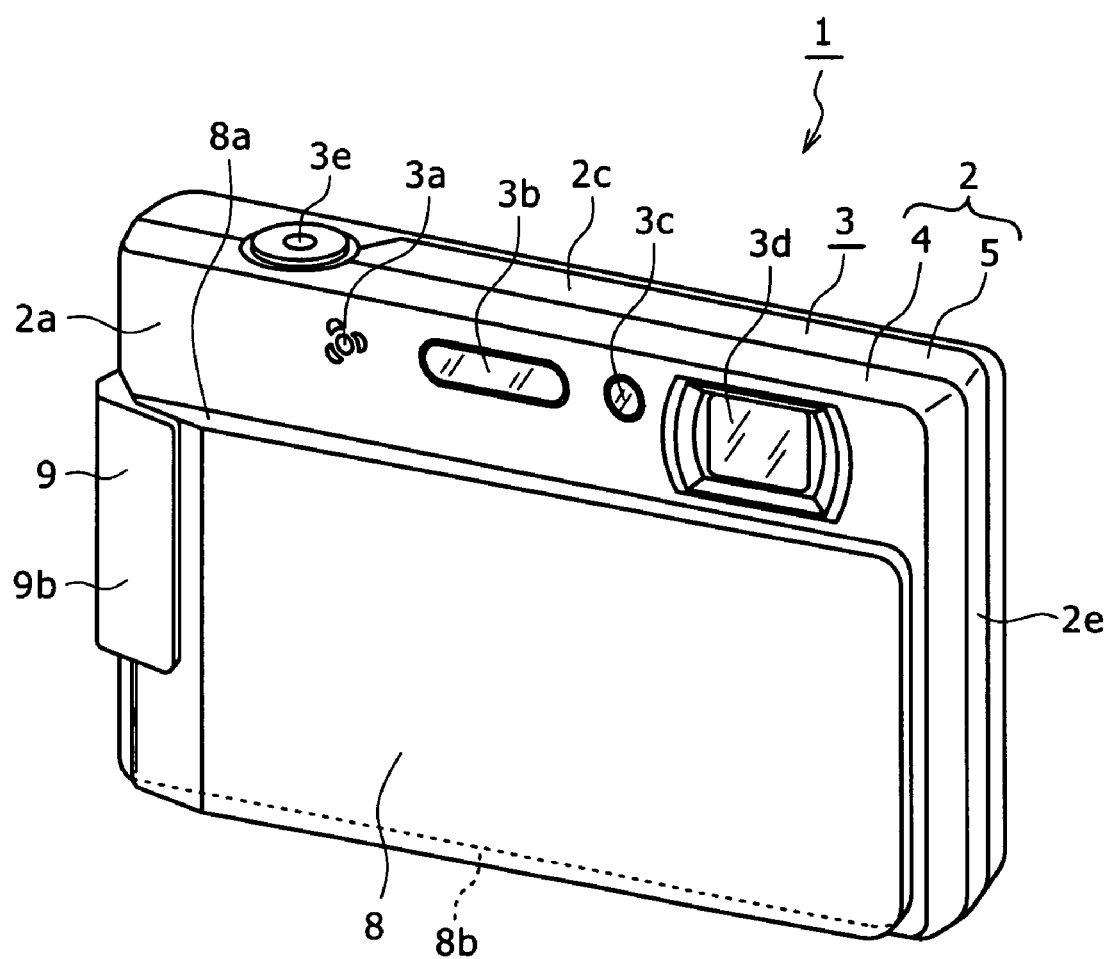

As shown in FIGS. 1 and 2, the entirety of the front wall 2a is substantially planner. A microphone 3a, a flash unit 3b, a self-timer lens 3c, and a capturing lens 3d are provided apart from one another in order from the righthand side on a top edge portion of the front wall 2a.

A shutter button 3e is provided on the top wall 2c.

A slide cover 8 is supported to the front wall 2a to be vertically slidable. The slide cover 8 has a vertical length shorter than the vertical length of the outer housing 2, and has a horizontal length substantially the same as the horizontal length of the outer housing 2.

At an upper end of a movement stroke, the slide cover 8 is positioned such that a top wall 8a thereof is positioned on the same plane as the top wall 2c (see FIG. 1). In this case, the position of the slide cover 8 is set to a closed position covering the microphone 3a, the flash unit 3b, the self-timer lens 3c, and the capturing lens 3d.

At a lower end of the movement stroke, the slide cover 8 is positioned such that a lower edge face 8b thereof is positioned on the same plane as the bottom wall 2d (see FIG. 2). In this case, the position of the slide cover 8 is set to an open position uncovering the microphone 3a, the flash unit 3b, the self-timer lens 3c, and the capturing lens 3d.

In the image capture apparatus 1, the power is turned on by sliding of the slide cover 8 from the closed position to the open position, and the power is turned off by sliding the slide cover 8 from the open position to the closed position.

Figure 3:
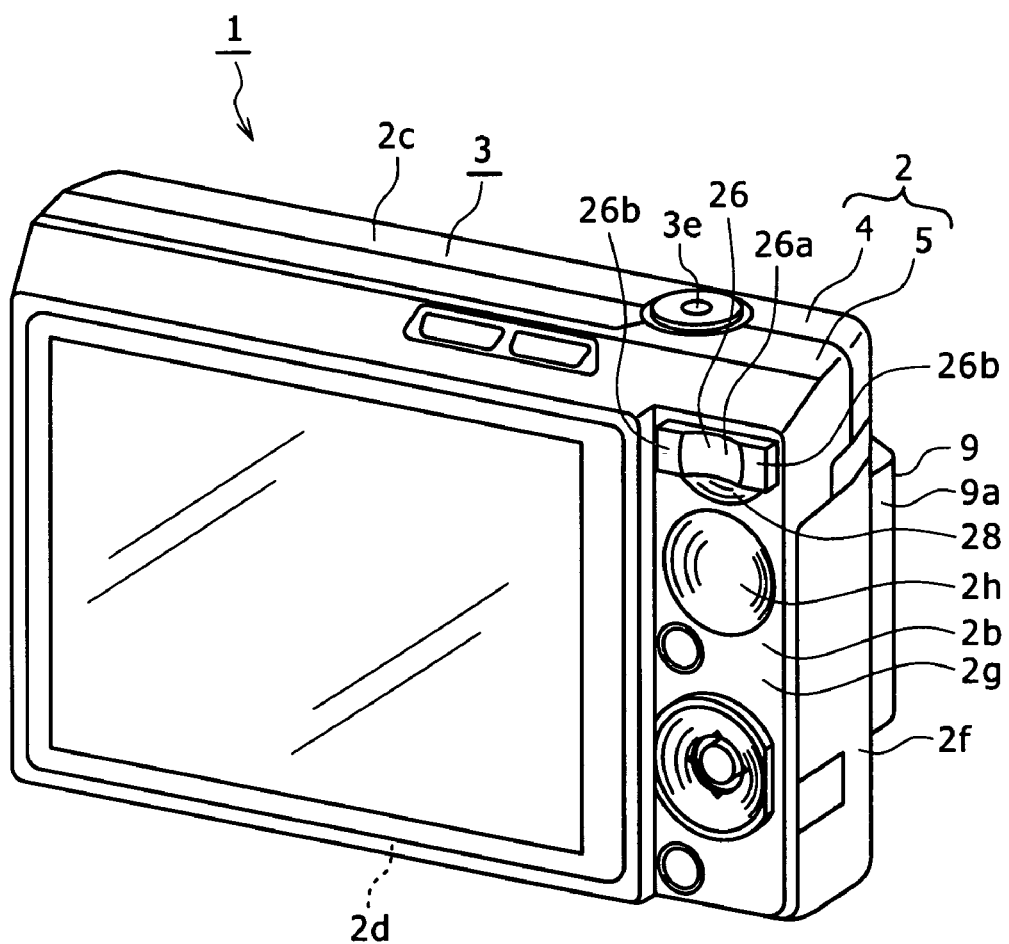
Figure 5:
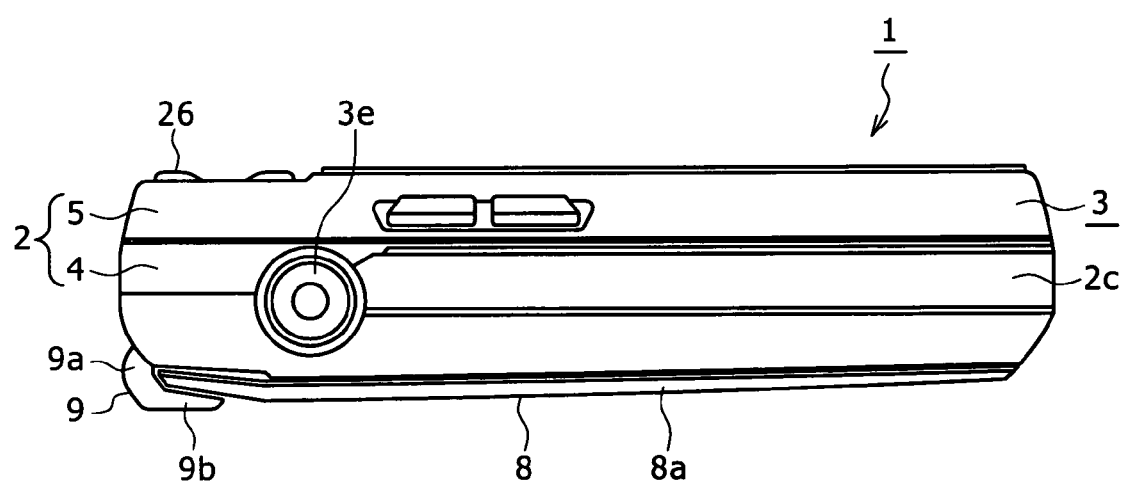

A grip projection portion 9 projects from the right sidewall 2f of the outer housing 2 (see FIGS. 1 to 3). As shown in FIG. 5, the grip projection portion 9 includes a continually formed portion 9a forwardly projecting from the right sidewall 2f and a finger placing portion 9b leftwardly projecting from a front edge portion of the continually formed portion 9a. The finger placing portion 9b is positioned closed to the front wall of the slide cover 8 or in the front portion of the slide cover 8, and allows the user to fit his/her fingers for holding the image capture apparatus 1. Thus, the outer housing 2, the slide cover 8, and the finger placing portion 9b overlap in a portion in the forward-rearward direction of the image capture apparatus 1. The forward-rearward direction can be alternatively referred to as an optical axis direction with respect to the light incident surface of the capturing lens 3d.

Figure 6:
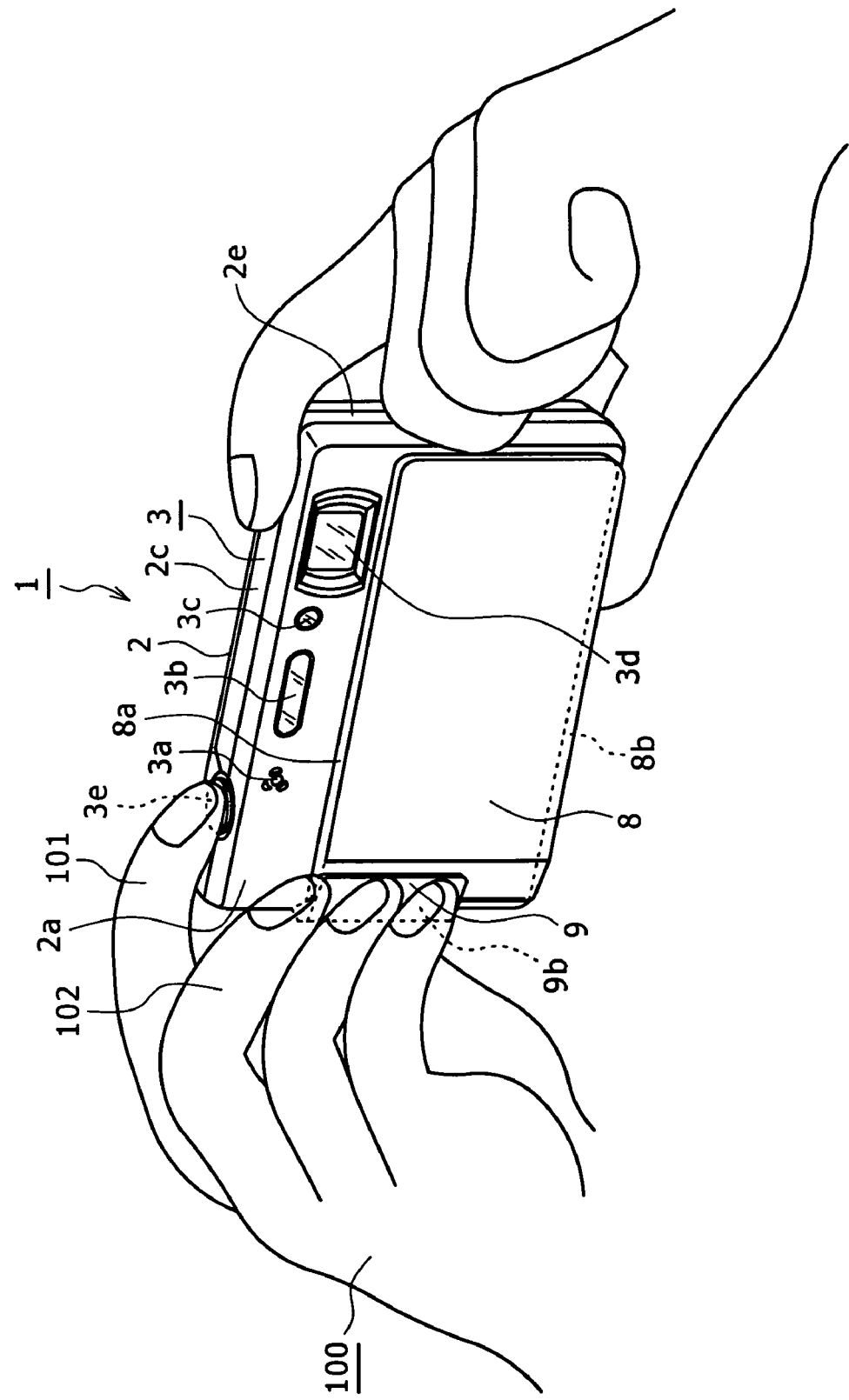

When the slide cover 8 is moved from the closed position to the open position, the top wall 8a is matched with a top wall of the finger placing portion 9b of the grip projection portion 9 (see FIG. 2). As such, as shown in FIG. 6, when the slide cover 8 is manually pushed down by the user to open whereby to shift to a capture state, fingers, such as first and second fingers 101 and 102, of a right hand 100 of the user, which fingers have been used to depress the slide cover 8, are placed on the finger placing portion 9b from the upper side.

Thus, in the image capture apparatus 1, in the state the slide cover 8, which is vertically slidable, is moved to the open position, the top wall 8a of the slide cover 8 is matched with the top wall of the finger placing portion 9b of the grip projection portion 9. As such, when the slide cover 8 has been completely opened, fingers (such as the first and second fingers 101 and 102) used to depress the slide cover 8 to open are placed on the finger placing portion 9b from the upper side. Thereby, image capture can be performed in continuation to the opening operation of the slide cover 8 without changing the holding finger positions, consequently enabling improving the ease of use or usability of the image capture apparatus 1.

Further, in the image capture apparatus 1, the grip projection portion is not provided to the slide cover 8, which is a movable member, but the grip projection portion 9 is provided to project from the outer housing 2, which is a fixed member. As such, the holding state with the fingers placed on the grip projection portion 9 is stable, and motion blurring caused by a camera shake or the like in the capture event is less likely to occur, consequently enabling improvement in ease of use or usability.

Further, the slide cover 8 can be formed to have a lateral width substantially the same as a lateral width of the outer housing 2. In this case, the lateral width of the slide cover 8 may be provided larger than in existing apparatuses. Thereby, the area size for finger placement in the opening/closing event can be increased, consequently enabling facilitating the open and close operations of the slide cover 8.

As described above, the flash unit 3b and the capturing lens 3d are disposed in the main body 3. Generally, however, it is known that when a flash unit (such as the flash unit 3b) and a capturing lens (such as the capturing lens 3d) are disposed close to one another, flashlight reflects on blood vessels in the eyeball of the user, whereby a so-called red-eye phenomenon is likely to occur.

As described above, however, in the image capture apparatus 1, the relatively large lateral width of the slide cover 8, which covers both the flash unit 3b and capturing lens 3d, can be provided. Thereby, the flash unit 3b and the capturing lens 3d can be disposed sufficiently apart from one another, so that the risk of causing such a red-eye phenomenon can be minimized.

Further, in the image capture apparatus 1, the grip projection portion 9 projects from the right sidewall 2f of the outer housing 2 so that the finger placing portion 9b is positioned in the front portion of the slide cover 8. As such, an opening need not be formed in the slide cover 8 to project the grip projection portion 9. Consequently, the mechanism can be simplified.

Figure 7:
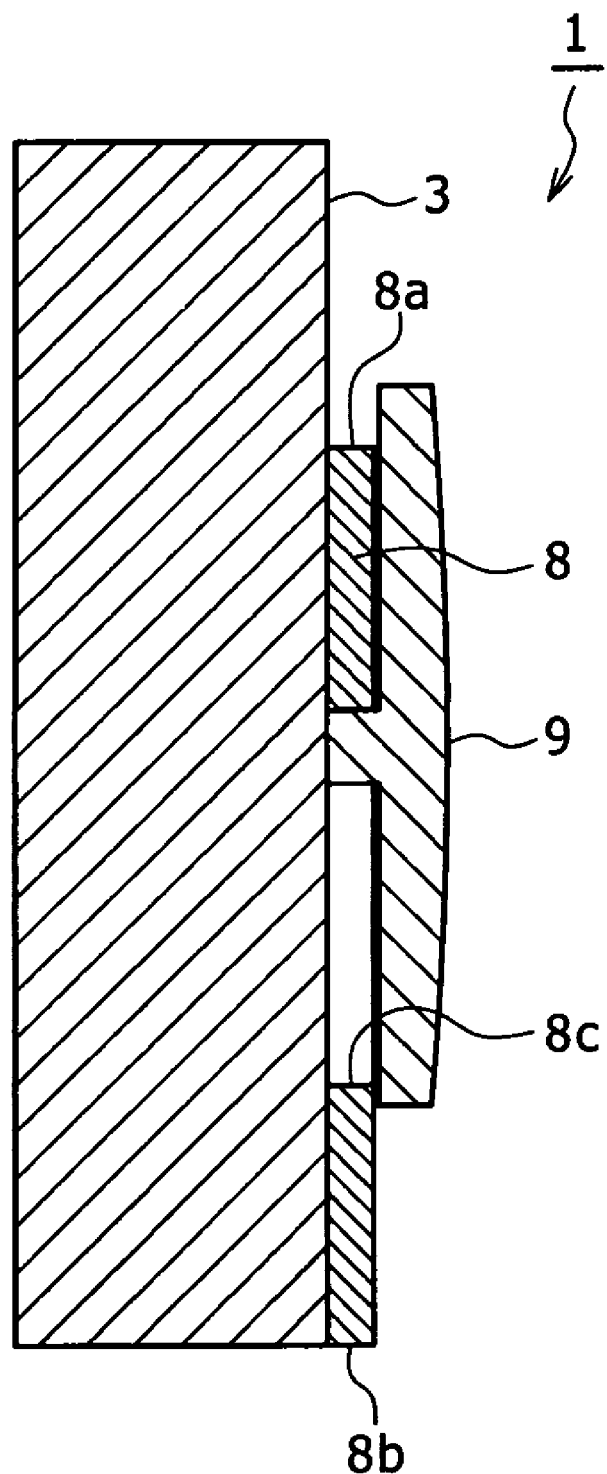
Figure 17:
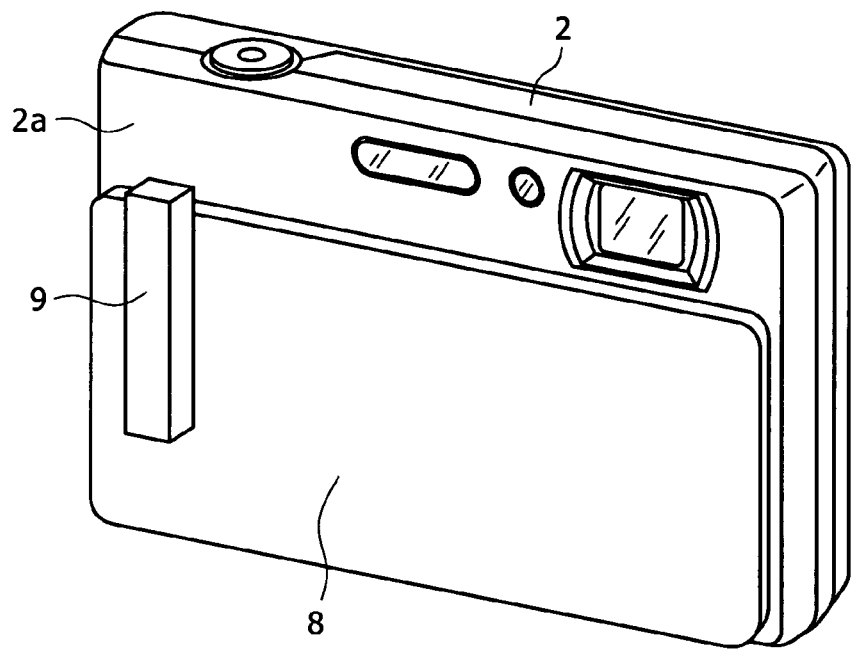
FIG. 17 is a perspective view of an example in a state in which a grip projection portion is provided to project from the front face of the outer housing.
Figure 18:
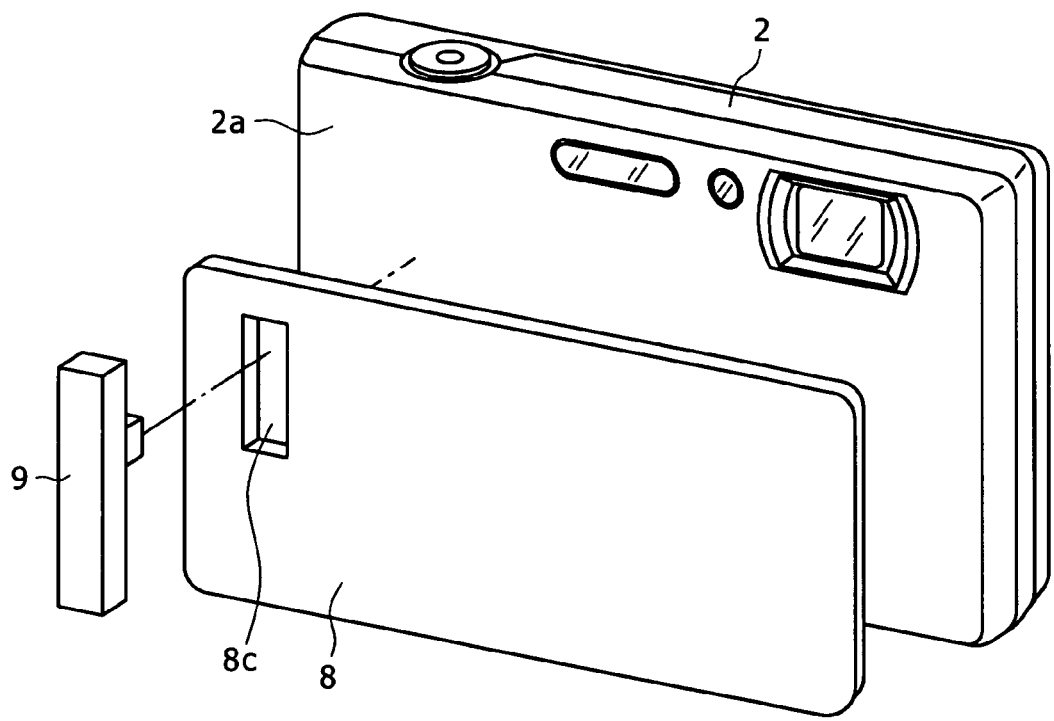
FIG. 18 is an exploded perspective view of the example in the state in which the grip projection portion is provided to project from the front face of the outer housing.

The configuration of the image capture apparatus 1 may be any one of examples shown in FIGS. 7, 17, and 18. More specifically, an insertion opening 8c is formed in the slide cover 8, and the grip projection portion 9 is provided to project from the front wall 2a of the outer housing 2, in which the grip projection portion 9 is inserted into the insertion opening 8c. In this case, degrees of freedom of the grip projection portion 9 in the position of disposition on the outer housing 2 can be increased.

Figure 8:
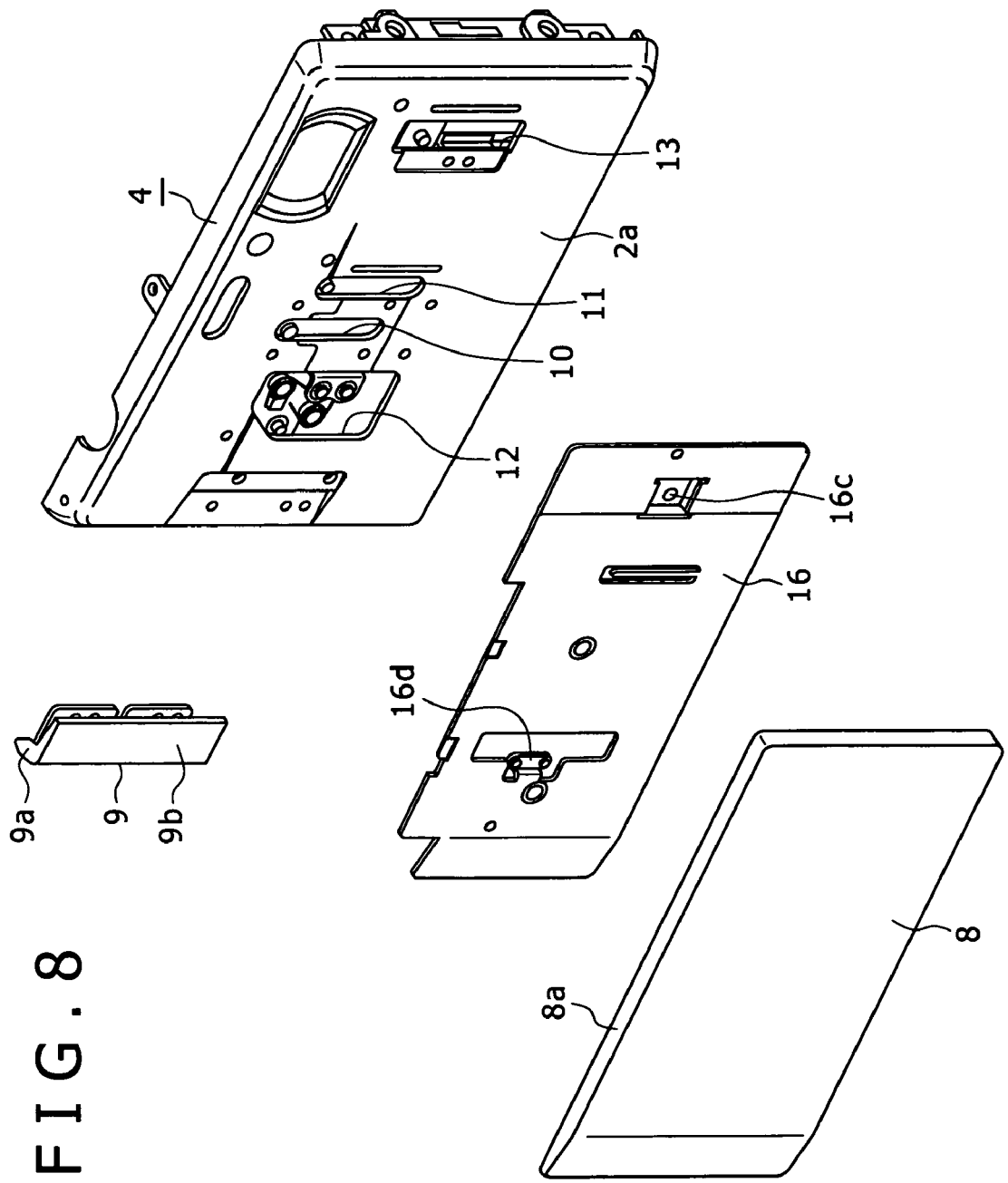
Figure 9:
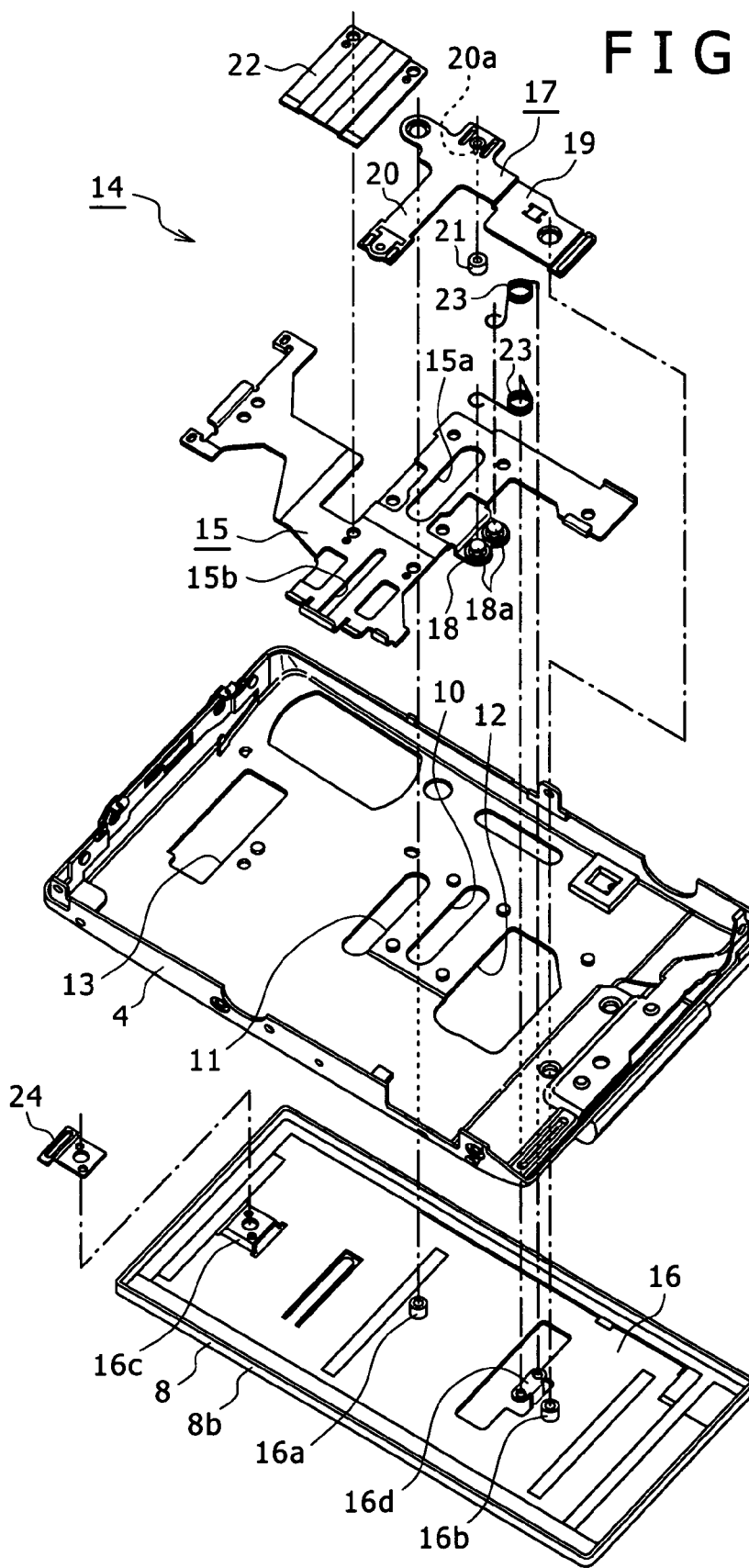

With reference to FIGS. 8 and 9, a vertically long support opening 10 is formed in the front wall 2a of the outer housing 2. The support opening 10 is formed in a position slightly closer to the side (righthand side) of the grip projection portion 9 than to a lateral center of the outer housing 2.

Vertically long connection holes 11 and 12, respectively, are formed on left and right portions with respect to the support opening 10 in the center in the front wall 2a of the outer housing 2. In addition, a vertically long holding opening 13 is formed in a position close to the left edge of the front wall 2a.

The slide cover 8 is moved by a slide mechanism 14 to slide relative to the main body 3.

Figure 10:
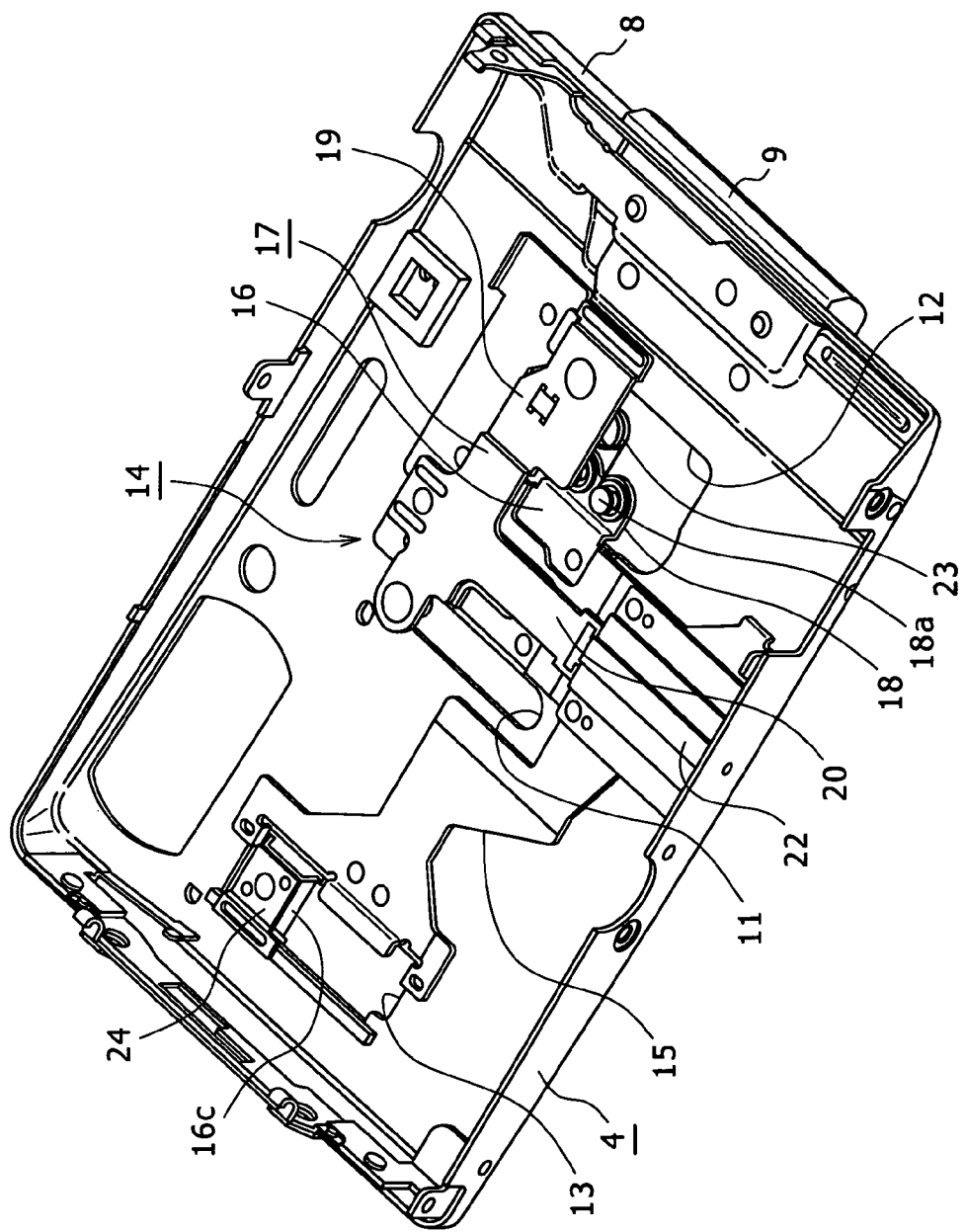

With reference to FIGS. 9 and 10, the slide mechanism 14 includes a support base 15 mounted on a rear wall of the front wall portion of the outer housing 2, a coupling plate 16 mounted on a rear face of the slide cover 8, and a slider 17 mounted on the coupling plate 16 movably supported to the support base 15.

The support base 15 includes a roller support opening 15a and a pin support opening 15b that are vertically apart from one another and that, respectively, vertically extend. A spring-support projection portion 18 is rightwardly provided from a portion in which the roller support opening 15a of the support base 15 is formed. To the spring-support projection portion 18, provided are spring support bosses 18a (18a and 18a) that are respectively rearwardly projected and that are vertically apart from one another.

The support base 15 is mounted on the rear wall of the front wall portion of the outer housing 2 in the state the roller support opening 15a overlaps the support opening 10. In this state where the support base 15 is mounted on the rear wall, the spring-support projection portion 18 is positioned in the connection hole 12.

The coupling plate 16 has coupling bosses 16a and 16b laterally apart from one another. The coupling plate 16 further has a coupling portion 16c in a position close to a left edge of its own. The coupling plate 16 further has a spring anchor piece 16d in the vicinity of the coupling boss 16b on the righthand side.

The slider 17 include a laterally long coupling plate portion 19 and a vertically long supported plate portion 20, and is formed into a shape in which a left edge side portion of the coupling plate portion 19 and a top end side portion of the supported plate portion 20 intersect with one another.

An axial portion 20a frontwardly projecting is provided in a top edge portion of the supported plate portion 20, and a supported roller 21 is rotatably supported on the axial portion 20a. A supported pin 20b forwardly projecting is provided to a lower edge portion of the supported plate portion 20.

The slider 17 is stacked on the support base 15 from the rear wall side. The supported roller 21 is inserted into the roller support opening 15a of the support base 15 and the support opening 10 of the outer housing 2 to be rotatably and movably supported. Further, the supported pin 20b is slidably supported on the pin support opening 15b of the support base 15.

Left and right edge portions of the coupling plate portion 19 are, respectively, coupled to the coupling bosses 16a and 16b of the coupling plate 16 through the connection holes 11 and 12. The slider 17 is coupled to the slide cover 8 via the coupling plate 16.

In the state the slider 17 is coupled to the slide cover 8, a cover plate 22 is mounted on the rear wall of the front wall portion of the outer housing 2. Thereby, a part of the supported plate portion 20 of the slider 17 is covered.

In the state the slider 17 is coupled to the slide cover 8, torque springs 23 (23 and 23), respectively, are supported between the spring support bosses 18a (18a and 18a) of the slider 17 and the spring anchor piece 16d of the coupling plate 16. By the torque springs 23, the slide cover 8 when in the closed position is upwardly urged, or the slide cover 8 when in the open position is downwardly urged. Thereby, backlash or loose contact of the slide cover 8 with the main body 3 can be prevented.

Further, in the state the slider 17 is coupled to the slide cover 8, a right edge portion of the coupling plate 16 is moved close to or in contact with a righthand side portion of the connection hole 12 from the rearward direction. Thereby, the slide cover 8 is prevented from being disengaged from the main body 3.

Further, in the state the slider 17 is coupled to the slide cover 8, a disengagement prevention piece 24 is mounted on the coupling portion 16c of the coupling plate 16 from the side of the rear. A left edge portion of the disengagement prevention piece 24 is moved closed to or in contact with a lefthand side of the holding opening 13, whereby disengagement of the slide cover 8 from the main body 3 is prevented.

Figure 11:
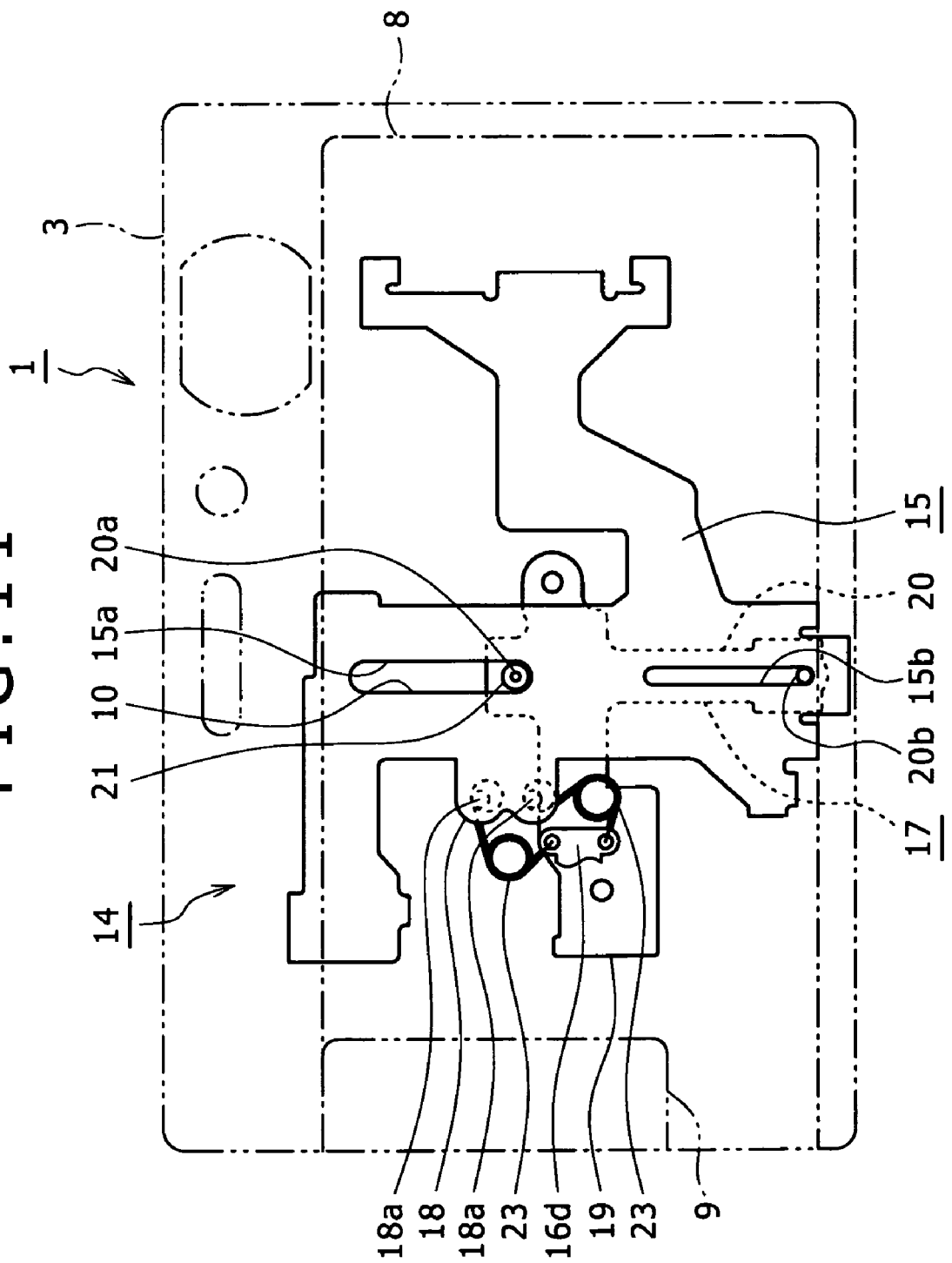

As shown in FIG. 11, in the state the slide cover 8 is in the closed position, when the slide cover 8 is depressed by the user, the slider 17 is downwardly slid in opposition to urging forces of the torque springs 23. Thereby, downward urging forces are generated by the torque springs 23, and the slide cover 8 is downwardly moved. In this event, while the supported roller 21 is being rotated on opening edges of the support opening 10 and the roller support opening 15a, the support opening 10 and the roller support opening 15a are downwardly moved, and the supported pin 20b is downwardly moved in and along the pin support opening 15b. A part of the slider 17 is regulated in movement by being in contact with a stopper (not shown) provided in the main body 3, whereby the slide cover 8 downwardly moved is set to the open position that corresponds to the lower end of the movement stroke.

Figure 12:
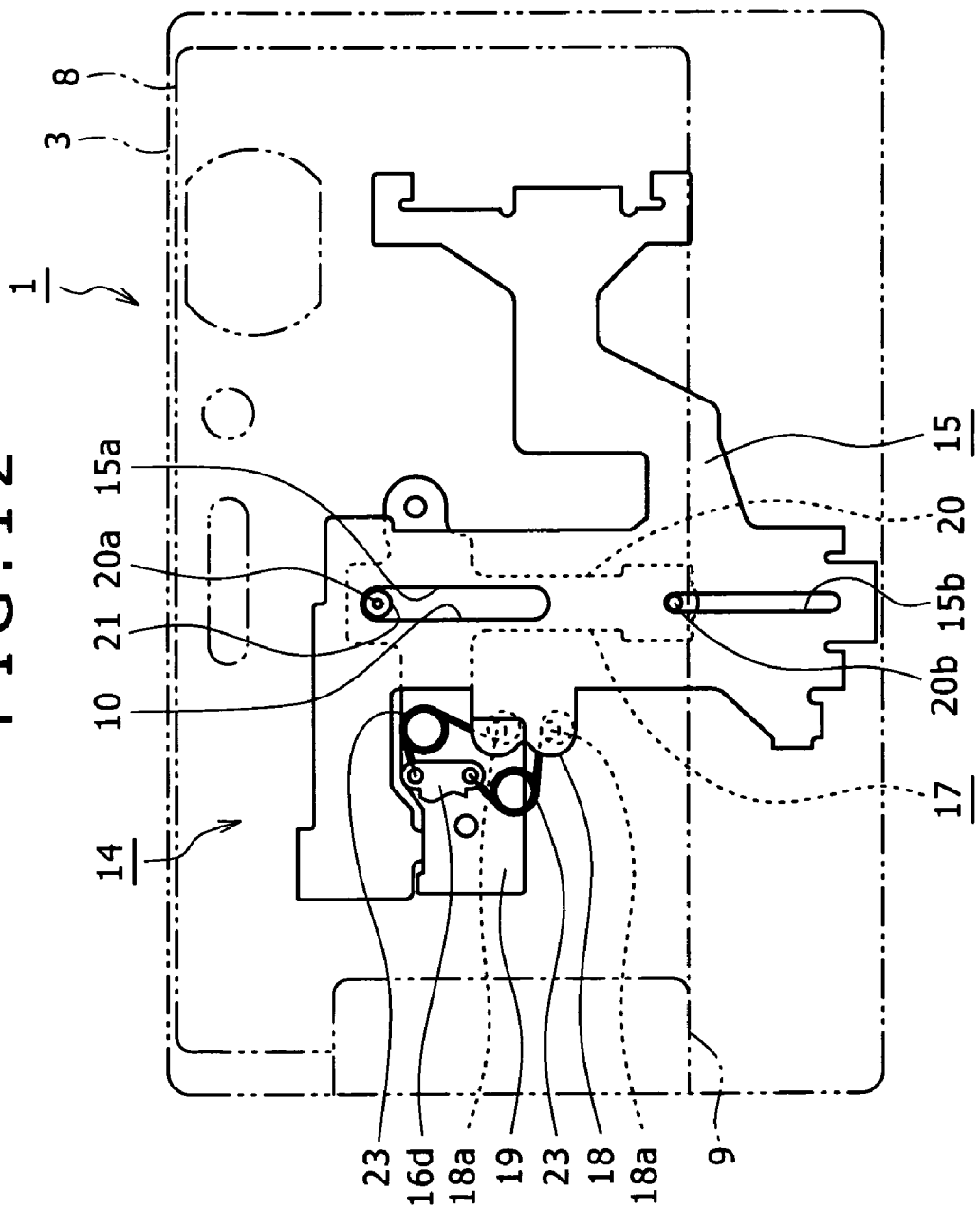

In contrast, as shown in FIG. 12, in the state the slide cover 8 is in the open position, when the slide cover 8 is pushed upward by the user, the slider 17 is upwardly slid in opposition to urging forces of the torque springs 23. Thereby, upward urging forces are generated by the torque springs 23, and the slide cover 8 is upwardly moved. In this event, while the supported roller 21 is being rotated on the opening edges of the support opening 10 and the roller support opening 15a, the support opening 10 and the roller support opening 15a are upwardly moved, and the supported pin 20b is upwardly moved in and along the pin support opening 15b. The part of the slider 17 is regulated in movement by being in contact with a the stopper (not shown) provided in the main body 3, whereby the slide cover 8 upwardly moved is set to the closed position that corresponds to the upper end of a movement stroke.

As described above, in the image capture apparatus 1, in the event that the slide cover 8 is moved, while being rotated along the opening edges of the support opening 10 and the roller support opening 15a, the supported roller 21 is vertically moved along the support opening 10 and the roller support opening 15a. Consequently, smooth slide operation of the slide cover 8 can be secured.

Further, the supported roller 21 is inserted into the support opening 10 formed in the outer housing 2, so that a disposition spacing of the supported roller 21 need not be limitedly provided in the interior or exterior of the outer housing 2, and the disposition spacing can be more effectively utilized. This makes it possible to reduce the overall thickness of the image capture apparatus 1.

Further, the support opening 10 is formed slightly closer to the side of the grip projection portion 9 than to the lateral center of the outer housing 2. As such, normally, the user is induced to depress a portion (right edge portion) of the grip projection portion 9 of the slide cover 8 to thereby open or close the slide cover 8. This makes it possible to perform smooth operation of the slide cover 8.

In the above, the embodiment has been shown and descried with reference to the example including only a single supported roller 21 for guiding the slide cover 8, but the configuration is not limited thereto. For example, the configuration can use a plurality of supported rollers 21 by using a supported roller 21 in place of the supported pin 20b. However, in the case the supported roller 21 is used, a maximum permissible error occurs in accordance with two types of clearances, namely, a clearance of the supported roller 21 to be formed with the axial portion 20a and a clearance of the supported roller 21 to be formed with the support opening 10. As such, there is a probability that a maximum permissible error between the slider 17 and the outer housing 2 is increased, so that it is desirable to use only the single supported roller 21 be used.

A monitor block 25 is provided in a portion excluding a right edge portion of the rear wall 2b of the outer housing 2. The right edge portion of the rear wall 2b is provided as a key disposition portion 2g.

A zoom key 26 and an operation key 27 are disposed vertically apart from one another in the key disposition portion 2g.

A recessed portion 28 is formed on the key disposition portion 2g. The recessed portion 28 has a substantially semicircularly curved shape in a portion continued to the lower edge of the zoom key 26. More specifically, the recessed portion 28 has a cone shape that has a depth gradually reducing towards the outer circumference and that has a deepest portion 28a that corresponds to a deepest inner portion.

Figure 13:
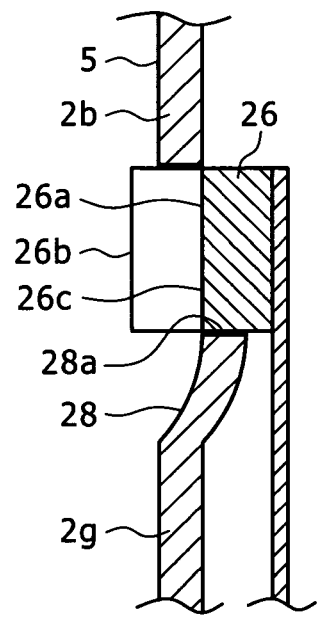

The zoom key 26 has a laterally long shape and has a recess portion 26a having a curved shape in a laterally central portion. Portions other than the recess portion 26a of the zoom key 26 are provided as planar portions 26b (26b and 26b) each having a planar rear wall. The recess portion 26a has a deepest portion 26c corresponding to a deepest central portion in the lateral direction (see FIG. 13), and has a shape in which the depth gradually reduces along the lateral (left-to-right) direction from the deepest portion 26c. The position of the deepest portion 26c of the recess portion 26a in the forward-rearward direction substantially matches the position of the deepest portion 28a of the recessed portion 28 in the forward-rearward direction.

The recessed portion 28 of the outer housing 2 is used for placement of a finger in the event of operation of the zoom key 26. In addition, the recessed portion 28 functions as a so-called finger rest in which a finger is placed in a non-operation (or non-capture) event. Further, the image capture apparatus 1 can be stably held in a manner that the image capture apparatus 1 is held such as to be clamped by placing fingers on the recessed portion 28 and front wall 2a of the outer housing 2.

As described above, the recessed portion 28 is used for placement of a finger in the event of operation performed on the zoom key 26. Further, the position of the deepest portion 26c of the recess portion 26a in the forward-rearward direction substantially matches the position of the deepest portion 28a of the recessed portion 28 in the forward-rearward direction. Consequently, in the event of operation performed on the zoom key 26, continual operation between telephoto and wide angle positions can be smoothly performed.

The portions other than the recess portion 26a of the zoom key 26 are provided as the planar portions 26b. Consequently, depression operation can be easily performed. In addition, the rear walls of the respective planar portions 26b are not sloped, so that the amount of rearward projection is reduced, and hence the overall thickness of the image capture apparatus 1 can be further reduced.

A finger-rest recess portion 2h having a cone shape with circular outer profile is formed between the portions in which the zoom key 26 and recessed portion 28 of the outer housing 2 are disposed (see FIG. 3). More specifically, the finger-rest recess portion 2h has a shape in which the depth is largest in the central portion and is gradually reduced towards the outer circumference.

In either capture or non-capture event, a finger can be placed on the finger-rest recess portion 2h to be able to rest thereon. Further, the image capture apparatus 1 can be even more stably held in a manner that the image capture apparatus 1 is held such as to be clamped by placing fingers on the finger-rest recess portion 2h and front wall 2a of the outer housing 2.

The operation key 27 is a so-called "cross key" depressible in at least four, upward, downward, leftward, and rightward directions. The operation key 27 is not only depressible in the four directions, but is also depressible in a central portion, thereby enabling execution of various functions.

Figure 14:
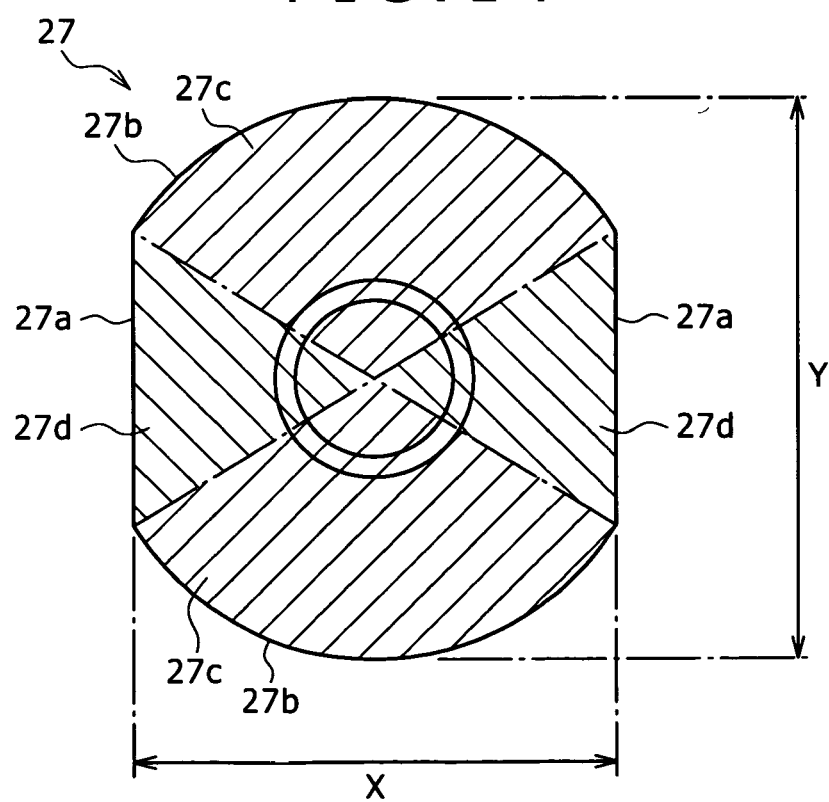

With reference to FIG. 14, the operation key 27 is formed as a whole into substantially a cone shape. More specifically, left and right outer circumferential edge portions, respectively, are formed as linear portions 27a (27a and 27a), and upper and lower portions of the outer circumferential edges formed as curved portions 27b (27b and 27b) that, respectively, are arcuate along the circumferential direction and convex along the upward-downward direction. The linear portion 27a on the lefthand side is positioned close to and along a righthand edge of the monitor block 25.

As described above, the operation key 27 is not formed into a circular shape, but is formed into the shape including the two linear portions 27a and the two curved portions 27b. Thereby, an operable area size is increased relative to the circularly formed case. Consequently, even in a configuration including a larger monitor block 25 and a smaller key disposition portion 2g, the image capture apparatus 1 need not be enlarged, but high operability of the operation key 27 can be secured.

The operation key 27 is depressible in at least four (upward, downward, leftward, and rightward) directions. Upper and lower areas to be operated in the event of upward and downward depression operations, respectively, are provided as first operation areas 27c (27c and 27c). Leftward and rightward areas to be operated in the event of leftward and rightward depression operations, respectively, are provided as second operation areas 27d (27d and 27d).

As shown in FIG. 14, the operation key 27 is configured as follows. A maximum distance Y between the curved portions 27b is larger than a distance X between the linear portions 27a. Accordingly, the area size of the respective first operative area 27c is larger than the area size of the respective second operative area 27d, such that the operation performed on the respective first operative area 27c is easier than the operation on the respective second operative area 27d. This is effective in the event that a boundary between the respective second operative area 27d and the respective first operative area 27c or an area close the boundary (near-boundary area) is operated by the user. In this event, even when the second operative area 27d is intended to be operated by the user, there is a risk that a function corresponding to the operation performed on the first operative area 27c may be executed due to an unintended shift of a finger.

Figure 15:
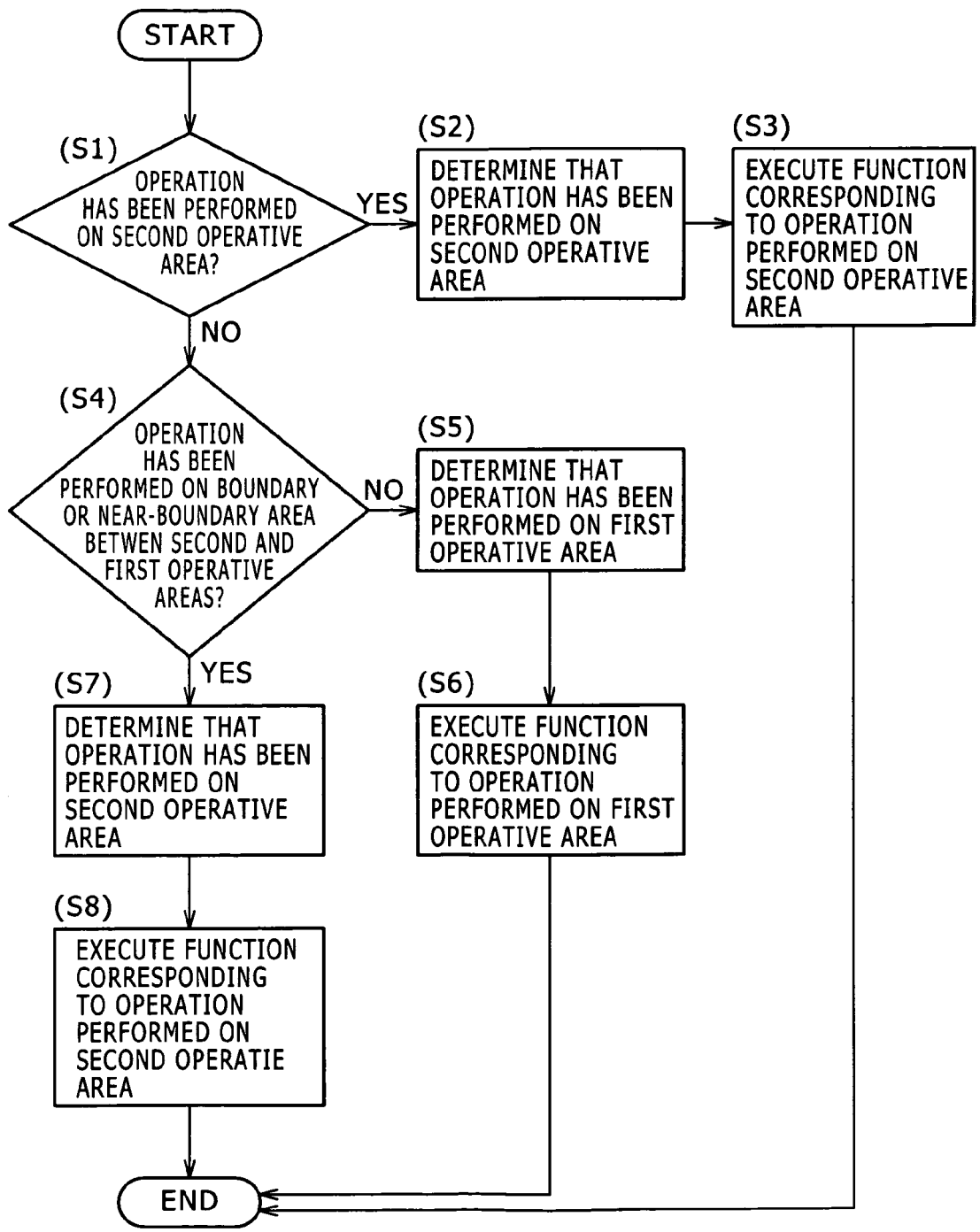

In the image capture apparatus 1, a respective function is executed in accordance with a process described below in response to a respective user operation of the operation key 27 (see FIG. 15).

The process is started when the operation key 27 is depressed by the user. At step S1, it is detected whether the depression is an operation performed on either of the second operation areas 27d. If it has been detected that the depression is the operation on the second operation areas 27d, then the process moves to step S2. Otherwise, if it has not been detected that the depression is not the operation on the second operation areas 27d, then the process moves to step S4.

At step S2, it is determined that the depression is the operation performed on the second operative area 27d.

At step S3, a function corresponding to the operation on the second operative area 27d is executed, and then the process terminates.

At step S4, it is detected whether the depression is an operation performed on a boundary or near-boundary area between the second operative area 27d and the first operative area 27c. If it has not been detected that the depression is the operation performed on a boundary or near-boundary area between the second operative area 27d and the first operative area 27c, then the process moves to step S5. Otherwise, if it has been detected that the depression is the operation performed on a boundary or near-boundary area between the second operative area 27d and the first operative area 27c, then the process moves to step S7.

As an example, control can be performed in the following manner to detect whether the operation performed on a boundary or near-boundary area between the second operative area 27d and the first operative area 27c. Four detection switches are respectively disposed in upper, lower, left, and right portions corresponding to the operation positions of the operation key 27. When one detection switch has been operated, it is detected that the operation is not an operation performed on a boundary or near-boundary area between the second operative area 27d and the first operative area 27c. Alternatively, when two detection switches, namely, an upper detection switch and any one of right and left detection switches or a lower detection switch and any one of right and left detection switches, have been simultaneously operated, it is detected that the operation is an operation performed on a boundary or near-boundary area between the second operative area 27d and the first operative area 27c.

As another example, control can be performed in the following manner to detect whether the operation performed on a boundary or near-boundary area between the second operative area 27d and the first operative area 27c. In addition to the upper, lower, left, and right detection switches, four additional detection switches are respectively provided between the upper, lower, left, and right detection switches corresponding to the operation positions of the operation key 27, whereby totally eight detection switches are provided. When one of the upper, lower, left, and right detection switches has been operated, it is detected that the operation is not an operation performed on a boundary or near-boundary area between the second operative area 27d and the first operative area 27c. Alternatively, when any of the additional detection switches disposed between the upper, lower, left, and right detection switches has been operated, it is detected that the operation is an operation performed on a boundary or near-boundary area between the second operative area 27d and the first operative area 27c.

As another example, control can be performed in the following manner to detect whether the operation performed on a boundary or near-boundary area between the second operative area 27d and the first operative area 27c. A large number of detection switches are circumferentially provided corresponding to operation positions of the operation key 27. Depending upon whether either one detection switch has been operated or two adjacent detection switches have been simultaneously operated, it is detected whether the operation is an operation performed on a boundary or near-boundary area between the second operative area 27d and the first operative area 27c.

At step S5, it is determined that the operation is an operation performed on the first operative area 27c.

At step S6, the function corresponding to the operation on the first operative area 27c is executed, and then the process terminates.

At step S7, it is determined that the operation is an operation on the second operative area 27d.

At step S8, the function corresponding to the operation on the second operative area 27d is executed, and then the process terminates.

Thus, in the image capture apparatus 1, the operation key 27 is configured such that the vertical and lateral widths of the operation key 27 is different from one another, so that operability of the side having the smaller width may be considered inferior to the side having the larger width. However, the configuration of the operation key 27 reduces the degree of a risk that the side having the larger width may be inadvertently operated although the side having the smaller width was intended to be operated. Consequently, operability can be improved.

Further, the operation key 27 is disposed so that one of the linear portions 27a is positioned closely to and along the monitor block 25, as described above. As such, by the effective use of spacing, enlargement of the operable area of the operation key 27 can be securely implemented, consequently enabling improvement of operability for the operation key 27.

Figure 4:
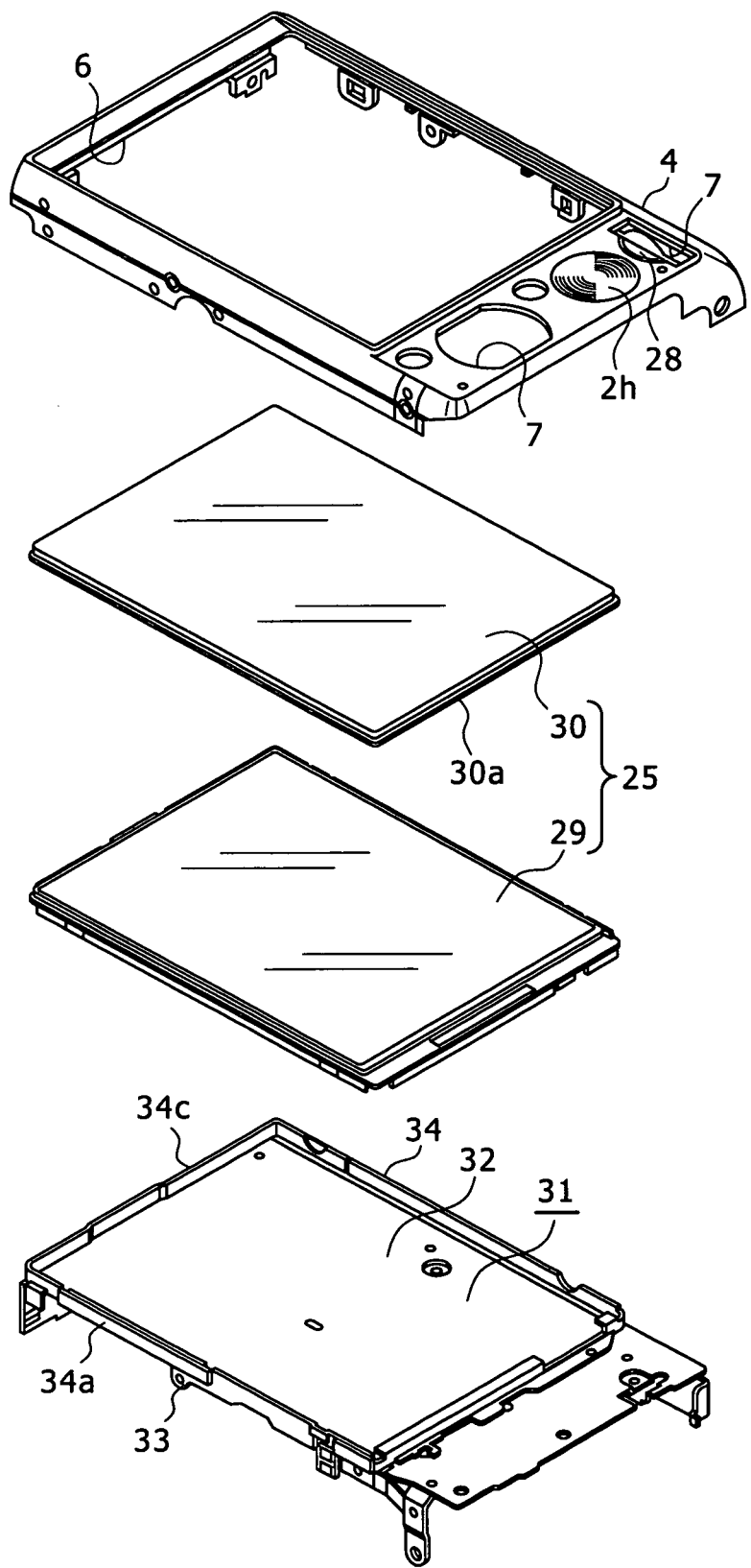

The monitor block 25 includes a display monitor 29 formed of a liquid crystal panel or the like, and a monitor cover 30 for covering the display monitor 29 from the rear side (see FIG. 4).

A chassis 31 formed of metal is disposed in the outer housing 2. The chassis 31 includes a holding wall portion 32 facing in forward-rearward direction, and a circumferential wall portion 33 projecting rearwardly from an outer circumferential surface of the holding wall portion 32. A holding frame 34 for holding the display monitor 29 is integrally provided to the chassis 31 by, for example, caulking or welding.

Figure 16:
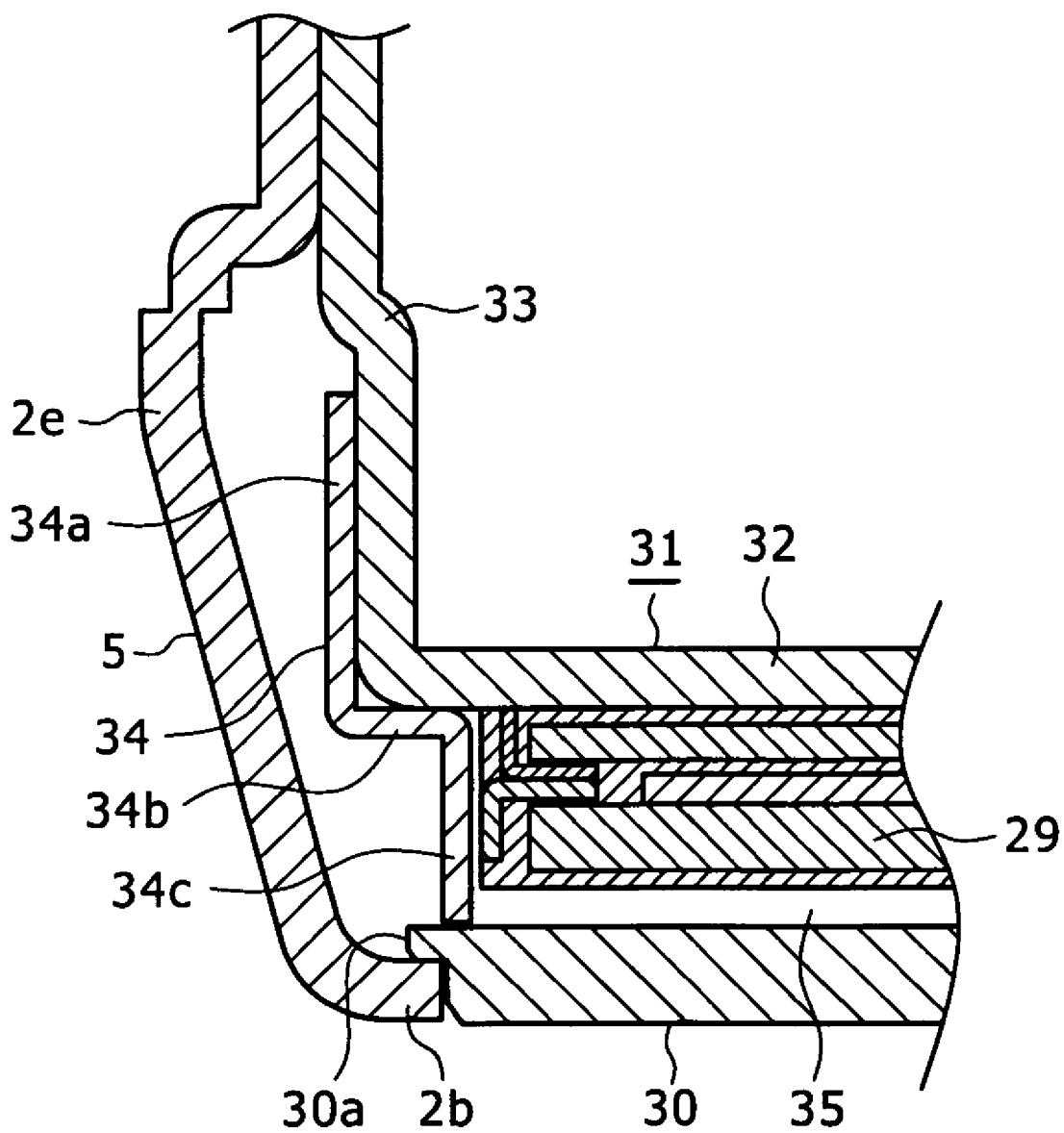

With reference to FIG. 16, the holding frame 34 includes a fixed portion 34a, a central portion 34b, and a holding portion 34c. The fixed portion 34a is fixed to an outer wall of the circumferential wall portion 33. The central portion 34b is projected inwardly from a rear edge of the fixed portion 34a. The holding portion 34c is projected rearwardly from an inner circumferential edge of the central portion 34b. The central portion 34b is in contact with an outer circumference portion of the holding wall portion 32.

The display monitor 29 is configured such that various types of optical sheets, such as diffusion sheets for diffusing light emanated from, for example, a liquid crystal panel functioning as an image display portion and a backlight, are arranged in a laminated state. The display monitor 29 is formed overall to be rectangularly planner.

A receiving projection portion 30a projecting outwardly from an outer circumference of a front edge portion of the monitor cover 30 is provided to the monitor cover 30.

The display monitor 29 is disposed by being inserted into and internally fitted to the holding portion 34c of the holding frame 34 in such a framed picture state. Then the display monitor 29 is secured in contact with the holding wall portion 32 by using an appropriate manner, such as screwing or adhering. The width in the forward-rearward direction of the holding portion 34c is larger than the thickness of the display monitor 29. In the state the display monitor 29 is fitted to the chassis 31, a space 35 is formed on the rear wall side of the display monitor 29 in the interior of the holding portion 34c.

The monitor cover 30 is disposed in the state an outer circumference portion of the front wall of the monitor cover 30 is in contact with a rear end wall of the holding portion 34c. The monitor cover 30 is mounted to the outer housing 2 in the manner that an opening edge of the monitor disposition opening 6 is compressed from the rear side to the receiving projection portion 30a. Consequently, the monitor cover 30 is mounted to the outer housing 2 in the state the monitor cover 30 is clamped between the holding portion 34c and the rear panel 5, and the space 35 is present between the front wall of the monitor cover 30 and the rear wall of the display monitor 29.

Thus, in the image capture apparatus 1, the display monitor 29 and the monitor cover 30 are held in the state they are in noncontact with one another. As such, even when external forces are exerted on the monitor cover 30 and deflection is thereby caused in the monitor cover 30, crazing, cracking, and/or the like defects can be prevented from occurring in the display monitor 29.

Further, the monitor cover 30 is clamped between the front edge face of the holding frame 34 and the part of the outer housing 2. As such, adhesion layers are not necessary for fixing the monitor cover 30 to, for example, the outer housing 2 and the holding frame 34. Consequently, the overall thickness of image capture apparatus 1 is not increased by such adhesion layers, and further, assemblability of the image capture apparatus 1 can be improved.

Further, the monitor cover 30 is clamed between the front edge face (rear edge face) of the holding frame 34 and the part of the outer housing 2. As such, forming portions for adhesion layers need not be provided to the opening edge of the monitor disposition opening 6 of the rear panel 5. This enables improving visibility of images being displayed on the display monitor 29 due to enlargement of the monitor cover 30.

The liquid crystal panel of the display monitor 29 is formed using glass material, similarly to general displays of this type, such that crazing, cracking, and/or the like defects are likely to occur on the panel when external forces have been exerted thereon. However, in the image capture apparatus 1, the display monitor 29 is held by being inserted into internally fitted to the holding portion 34c of the holding frame 34 in such a framed picture state. Consequently, the edge faces of the display monitor 29 are protected by the holding portion 34c, and hence crazing, cracking, and/or the like defects can be effectively prevented from occurring on edge faces of the display monitor 29.

In addition, the part, that is, the front edge portion, of the monitor cover 30 is disposed in the interior of the outer housing 2. Consequently, the overall thickness of the image capture apparatus 1 can be reduced.

Further, in the image capture apparatus 1, since the holding frame 34 is formed of the metal material, the configuration can be improved in miniaturization and stiffness in comparison to the configuration in which the holding frame 34 is formed of a resin material.

While the shapes and constructions of the individual portions are described and shown in detail with reference to the embodiment and examples, they are merely practical examples for carrying out the present invention, so that they should not be construed as limiting the technical scope of the invention.

What is claimed is:

1. An image capture apparatus comprising:
   an outer housing;
   a capturing lens disposed on a front face of the outer housing;
   a slide cover vertically slidable relative to the outer housing between a closed position covering the capturing lens and an open position uncovering the capturing lens; and
   a grip projection portion projecting from the outer housing and including a finger placing portion allowing a user to place fingers of the user,
   wherein the grip projection is not provided on the slide cover and is provided on the outer housing with the finger placing portion thereof being positioned frontwardly of the slide cover so as to extend outward of the slide cover along an optical axis direction, such that the grip projection along with the finger placing portion do not move relative to the outer housing when the slide cover is moved vertically between the closed position and the open position or between the open position and the closed position, and
   wherein in the open position, a top face of the slide cover and a top face of the grip projection portion match with one another so as to be aligned horizontally.

2. An image capture apparatus according to claim 1, wherein:
   the slide cover is vertically slidable along an upward-downward direction of the outer housing; and
   an upper end of a slide stroke in the upward-downward direction corresponds to the closed position, and a lower end of the slide stroke corresponds to the open position.

3. An image capture apparatus according to claim 1, wherein the grip projection portion includes:
- a continually formed portion projecting from a sidewall of the outer housing; and
- the finger placing portion projecting from a front end side of the continually formed portion and positioned forwardly of the slide cover and on a front face of the slide cover.

4. An image capture apparatus according to claim 1, wherein a width of the front face of the outer housing in a direction perpendicular to a slide direction of the slide cover is substantially the same as a width of the slide cover in the direction perpendicular to the slide direction.

5. An image capture apparatus according to claim 1, wherein the slide cover includes an insertion opening, and the grip projection portion is inserted into the insertion opening of the slide cover.

* * * * *